Jan. 29, 1957     KAZUO ISHIKAWA     2,779,882
LOW POWER CONSTANT TORQUE MOTOR

Filed March 29, 1955                          2 Sheets-Sheet 1

United States Patent Office 2,779,882
Patented Jan. 29, 1957

2,779,882
LOW POWER CONSTANT TORQUE MOTOR

Kazuo Ishikawa, Setagaya-ku, Tokyo, Japan

Application March 29, 1955, Serial No. 497,641

13 Claims. (Cl. 310—40)

This invention relates to the improvement in a small-sized direct current torque motor having two pole magnetic field and three pole rotatable armature. More particularly it relates to the improvement in a very small clock motor which may be readily driven by a single dry cell.

In general a small clock motor of this kind rotates at a very low rate of velocity. An object of the invention is to provide a direct current torque motor which maintains the constancy of instantaneous torque in every position of the armature.

It is generally accepted that, while a direct current motor rotates at high speed, the torque of the armature in any position, i. e. the instantaneous torque is constant due to the moment of inertia of the armature. However, if there is such a condition, for instance, in the use of a motor as clock-driver, that the motor becomes slow in rotation to the extent of several times per minute and it works intermittently, the torque changes according to the number of interlinkages of the magnetic flux with the armature coil and also varies discontinuously due to the fact that the current of the armature changes when a brush bridges over two adjoining segments of the commutator. In order to avoid such changes of torque, it is a matter of common knowledge to increase pole number of the magnetic field or armature, but this is rather expensive and causes difficulties in making a small-sized motor.

The torque of a direct current motor depends upon the condition of the magnetic field and armature, as clearly shown in the following formula.

$$T = \sum K.B.e.ni \quad (1)$$

$$i \cong \frac{E}{R}$$

wherein T designates torque, K the constant, B the effective magnetic density of field, $e$ the effective length of the armature coil which is interlinked with magnetic flux, $n$ the number of turns of the armature coil, E the applied terminal voltage, R resistance of the armature coil, and $i$ the current in coil.

The invention is illustrated by way of example in the accompanying drawings by which the invention will be fully understood.

Figs. 4, 5 and 6 are plans showing the working of the invention, in which:

Fig. 4 is a plan showing the relation of respective fan-shaped coils with electric current in a given position of the armature.

Fig. 5 is a plan showing the relation between electric current and a fan-shaped coil which bridges over both pole faces of the magnet.

Fig. 6 is a plan showing the relation between electric current and a coil, when one of the coils is positioned in the sides opposite to a magnetic pole face.

Figure 1:
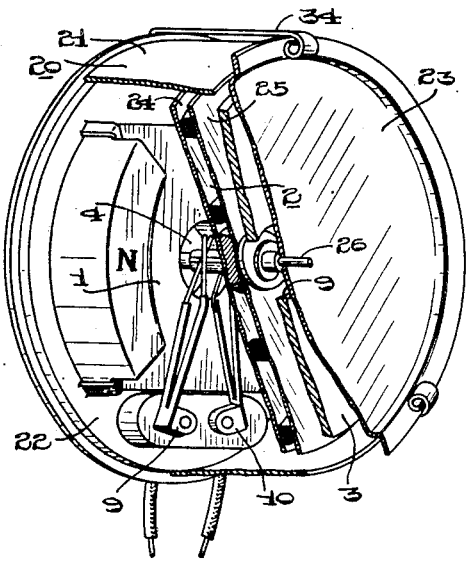
Fig. 1 is a front view showing the direct current torque motor according to the invention.
Figure 2:
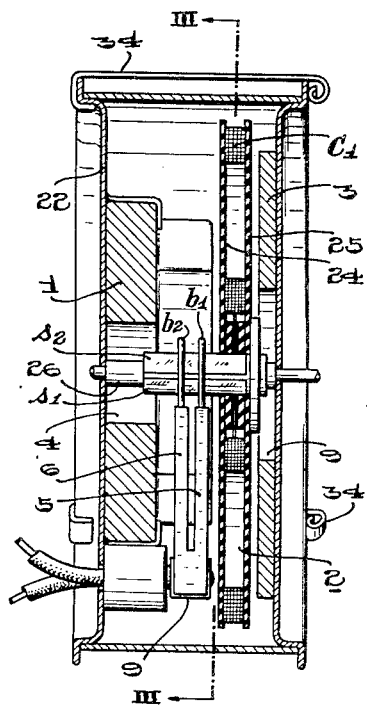
Fig. 2 shows a longitudinal section of the direct current torque motor.
Figure 3:
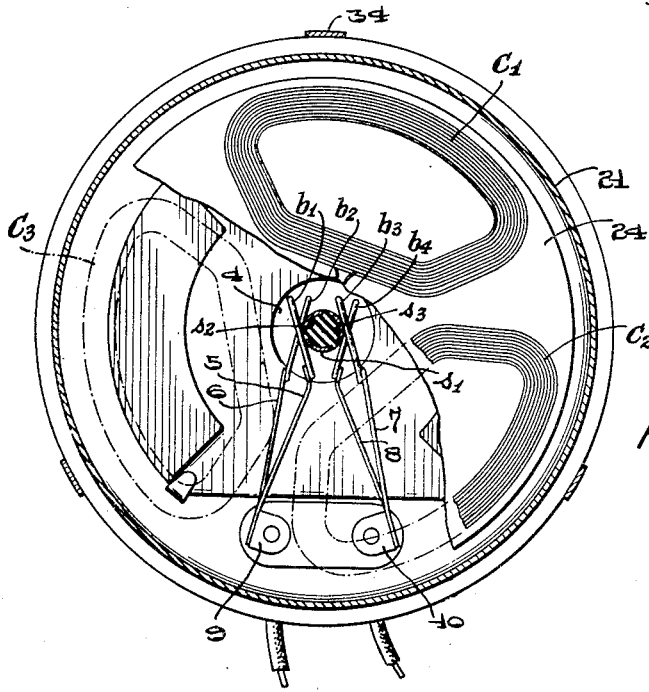
Fig. 3 is a sectional view through the motor, taken in the plane of the line III—III in Fig. 2.

In Figs. 1, 2 and 3 showing the torque motor of the invention, a casing 20 comprises end plates 22 and 23 fixed by clips 34 at both sides of a cylinder 21. A field magnet 1 composed of permanent magnet or electro-magnet and a magnetic ring plate 3 are fixed to the end plates 22 and 23 respectively. In the space between the field magnet 1 and the magnetic ring plate 3 rotates an armature 2 comprising three coreless fan-shaped coils $C_1$, $C_2$ and $C_3$ which are held between two thin discs 24 and 25 and separated from each other at a space angle of 120°. The pole faces of the opposite poles N and S of the field magnet 1 facing toward the magnetic ring plate 3 are formed in the shape of fan having an outside diameter of $\gamma_o$ and an inside diameter of $\gamma_i$ so as to create an angle of 90° between the lines 27 and 28 which link two sides of the pole face with the center of an arbor 26 of the armature. Each coil $C_1$, $C_2$ or $C_3$ is fan-shaped similar to the pole face of the magnet. The angle formed between center-lines 11 and 12 through the width of the straight coil parts 13 and 14, that is, effective parts which interlink with the magnetic flux in the air gap, is also 90° (see Fig. 4). The arbor 26 fixed to the armature 2 passes through apertures 4 and 9 of the magnet 1 and the ring plate 3 to be supported by end plates 22 and 23. Three segments $s_1$, $s_2$ and $s_3$ insulated from each other and also from the arbor 26 are provided thereon to form a commutator. Pairs of brushes $b_1$, $b_2$ and $b_3$, $b_4$ are connected respectively with spring fingers 5, 6 and 7, 8 connecting with terminals 9 and 10.

In a motor designed as described above, the magnetic density of field (1) is considered substantially constant because of the uniformity of space length or air gap. Further the effective length of the coil which is perpendicular to the direction of the rotation, is also constant and is equal to the difference between the outside radius and the inside radius, namely $(r_o - r_i)$, since the centre of the fan-shaped field magnet is co-axial with the centre of the armature. Hence the Formula 1 may be written as $$T = K.B.e\Sigma ni \quad (2)$$

Accordingly, if the total of the ampere-turns $\Sigma ni$ is constant, the torque T in the Formula 2 will be constant. Now it will be shown in the following that $\Sigma ni$ is constant.

It is evident that the armature has the same effect at a given position and at the position rotated by one half rotation, that is by $\pi$, from the starting given position, since the magnet field is two poles type and two sets of brushes are provided. Further, the armature has three coils, and each coil is arranged to have $\frac{2}{3}\pi$ phase difference from the adjoining coil. When one of the coils is in a phase of $\psi$, the phases of the three coils are $\psi$, $\psi + \frac{2}{3}\pi$ and $\psi + \frac{4}{3}\pi$ respectively. When the armature is rotated by $\pi$, their positions will be $\psi + \pi, \psi + \frac{5}{3}\pi$ and $\psi + 2\frac{1}{3}\pi$. But the effects of the coils in these two positions will be same as stated in the above. Further, it will be noted that the total effect of the coils in the position of $\psi + \pi$, $\psi + \frac{5}{3}\pi$ and $\psi + 2\frac{1}{3}\pi$ is equal of that of the coils in the positions of $\psi + \frac{1}{3}\pi$, $\psi + \frac{5}{3}\pi$, each of which is identical with the position advanced by $\frac{1}{3}\pi$ from the starting position of the armature. Thus, if it is explained that $\Sigma ni$ is constant during the period of $\frac{1}{3}\pi$ only from the starting position, the phase $\psi$, it will be sufficient.

Figure 4:
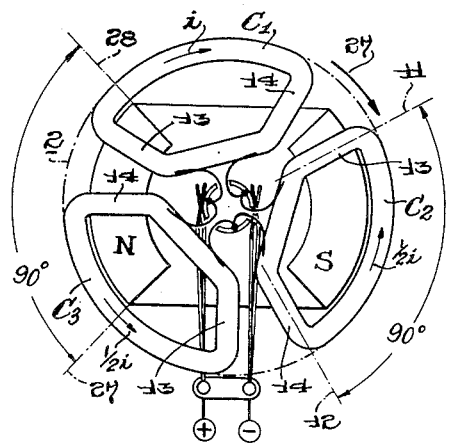

Fig. 4 illustrates the coils $C_1$, $C_2$ and $C_3$ in a given position. The parts of coils which produce rotating force are those existing within the magnetic field, viz. the left side parts 13, 13 (the left side as seen from the centre; hereinafter so defined) of the coils $C_1$, $C_2$ and the right side part 14 of the coil $C_3$. The electric current in the coil $C_1$ is $i$, as the voltage E is directly applied to it. On the other hand, the coils $C_2$ and $C_3$ are connected in series with the source of voltage E, and consequently the resistance is doubled and the current is naturally $\frac{1}{2}i$ respectively.

As each coil has the same number of turns $n$, it will be formulated as follows:

$$\Sigma ni = ni + \frac{1}{2} ni + \frac{1}{2} ni = 2ni$$

wherein $ni$ designates the number of ampere turns of the left part of coil $C_1$, $\frac{1}{2} ni$ the left part of coil $C_2$ and also the right part of the coil $C_3$.

When the armature 2 is rotated from any given position as shown in Fig. 4 in the direction as indicated by the arrow 27', the above mentioned relation will be maintained, so long as the effective left part 13 of coil $C_1$ remains in the position facing the N pole.

Figure 5:
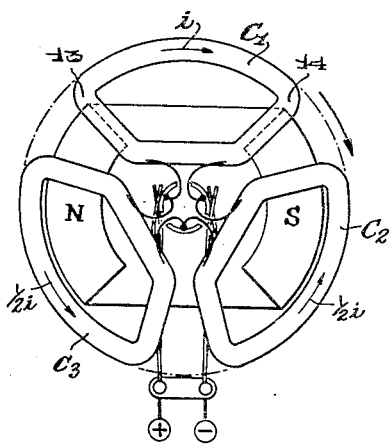

Fig. 5 illustrates that one half of the left side 13 and one half of the right side 14 of coil $C_1$ are facing to the pole faces N and S respectively. Since each of the pole faces is a fan-shape having an angle of 90° at centre of the armature and the angle between the centre lines 11 and 12 through the width of the fan-shaped coil is also 90° at centre of the armature, it is evident that when the left side 13 of the coil $C_1$ leaves partially from the pole face N, the right side 14 of the coil $C_1$ comes upon the pole face S in proportion to the leaving part of the left side 13.

In the position of Fig. 5, one half of the left side 13 of coil $C_1$ is facing to the pole face N and one half of the right side 14 to the pole face S. Thus the formula may be described as follows:

$$\Sigma ni = \frac{1}{2} ni + \frac{1}{2} ni + \frac{1}{2} ni + \frac{1}{2} ni = 2ni$$

wherein $ni$ indicates in order respectively ampere turns of the left and right side of $C_1$ and the left and the right side of $C_2$ and $C_3$.

When the left side 13 of the coil $C_1$ entirely leaves from the pole face N, the right side 14 wholly enters a position facing to the pole face S, and consequently the following fromula will be established.

$$\Sigma ni = ni + \frac{1}{2} ni + \frac{1}{2} ni = 2ni$$

wherein $ni$ indicates number of ampere turns of the right side of $C_1$ and $\frac{1}{2} ni$ indicates respectively in order ampere turns of the left and the right side of $C_2$ and $C_3$.

Figure 6:
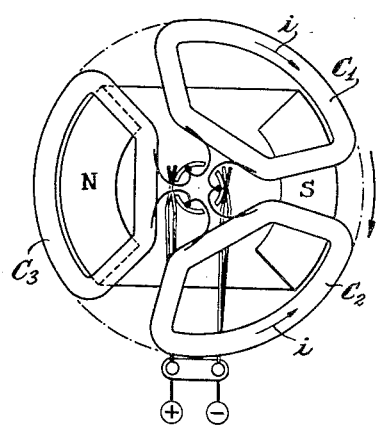
Figure 8:
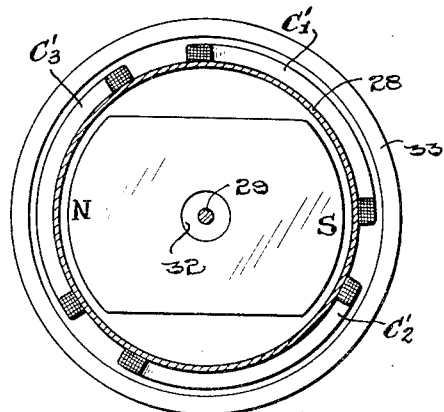
Fig. 8 is a traversal section of Fig. 7.

When the armature is further rotated in the position of Fig. 6 where a part of the right side of the coil $C_3$ is leaving from the pole face N, then a part of the left side of the coil $C_3$ will enter a position facing to the face of said pole. On this occasion, the usual construction, the torque of the motor is gradually decreased and cannot be maintained constant due to the fact that the currents on the left side and the right side of the coil $C_3$ take different directions and act to rotate in different directions thereby counteracting against each other.

In order to prevent such variation, the brushes in the present invention are arranged to have an angle sufficient to shut off the current from the coil $C_3$ by making short-circuit to the commutator during the period from the time of the start of leaving of the right part of the coil $C_3$ from the pole face N to the completion of leaving therefrom. In this case, both coils $C_1$ and $C_2$ are directly applied with voltage E, so the current in these coils is $i$ respectively, while the current of the coil $C_3$ is nil because of the short circuit. Accordingly the following formula is established.

$$\Sigma ni = ni + ni = 2ni$$

wherein $ni$ indicates respectively number of ampere turns of the right and the left side of the coil $C_1$ and $C_2$.

Consequently, it is seen that the sum $ni$ of the ampere turn in any position of the rotor is of a constant value and is equal to $2ni$. Hence the value of the torque obtained from Formula 2 is likewise constant, and therefore the instantaneous torque is, at all time, constant.

Figure 7:
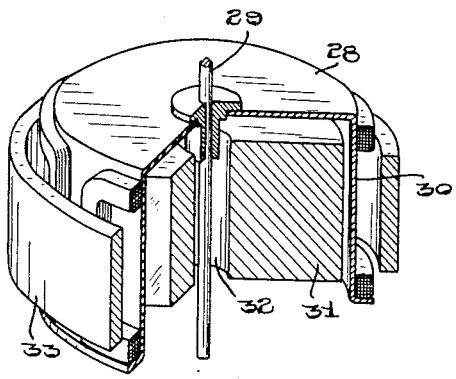
Fig. 7 is an oblique view showing a modification of the invention, which is partially omitted.

Fig. 7 illustrates a modified form of the invention in which the armature takes the form of a cylinder made of nonmagnetic material. An arbor 29 is fixed in the armature and a commutator is provided at the arbor in a suitable position. On the periphery 30 of the cylindrical armature 28 there are provided three coils $C_1'$, $C_2'$ and $C_3'$ which are separated from each other at a space angle of 120° and also have the same number of turns respectively. A permanent magnet 31 is fixed in the armature by proper means. The arbor 29 is supported by an axle bearing (not shown) through the center opening 32. The outer circumference of the armature 28 is covered with a magnetic body 33. Both pole faces N and S of the magnet 31 forms a part of the circumference. This circular arc, the cylindrical armature 28 and the magnetic cylinder 33 have their own center axes on the same axial line with the arbor 29. Both ends of each pole face N or S contain an angle of 90° on the center axis of the arbor 29. The same angle is also made on the center axis of the arbor 29 by the effective parts of the coils $C_1'$, $C_2'$ and $C_3'$, namely, both side parts of the coil which extend in the direction of the axis. The connection and arrangement of commutator, brushes and coils are made in the same way as shown in Figs. 1–6. Accordingly the torque motor in the modified form can work at a low rate of velocity, maintaining constant torque at all times on the same principle as described above.

What is claimed is:

1. A constant torque direct current motor comprising an armature including three fan-shaped coils, a stator including two fan-shaped pole pieces producing a magnetic field, and a commutator, the angle subtended at the axis of rotation of the armature by adjacent pole pieces being equal to the angle subtended by the coils at said axis, said commutator being adapted to short circuit each coil while the effective portions thereof overlie any one of said pole pieces whereby the number of magnetic flux linkages between the field and the coils are maintained constant.

2. A motor as claimed in claim 1, wherein said armature is in the form of a disc.

3. A motor as claimed in claim 2 wherein the angle subtended at said axis by the pole pieces is 90°, and wherein the angle subtended by the effective portions of said coil at the axis is 90°.

4. A motor as claimed in claim 3 wherein the commutator includes three segments mounted upon and insulated from the stator.

5. A motor as claimed in claim 4 comprising brushes associated with the commutator, each of said brushes comprising a pair of spring fingers fitted with contact pieces.

6. A motor as claimed in claim 5 wherein said armature includes a non-magnetic cylindrical shell, the three coils being mounted on the cylindrical part of said shell and being equally spaced around said cylindrical part, the effective portions of each coil subtending 90° at the axis of rotation of the armature, a first permanent magnet being disposed within said cylindrical part, and a second permanent magnet outside said part, and wherein each pole of one of said magnets subtends an angle of 90° at said axis, and wherein the other of said magnets is cylindrical.

7. A constant torque direct-current motor, operative with a voltage source, comprising a first member including a plurality of fan-shaped coils symmetrically spaced about an axis, a second member including a plurality of magnetic pole pieces producing a magnetic field and symmetrically spaced about said axis, said first and second members being in substantially parallel planes and relatively displaceable with respect to each other by rotation of one of said members about said axis, each of said coils having effective portions extending transverse to the rotary direction of travel of the rotating member, said pole pieces being spaced at predetermined angles, said coils being angularly spaced and having their effective portions angularly spaced so that at least one effective portion of each coil is always within the magnetic field of one of said pole pieces, and means for controllably coupling said coils to the voltage source so that the product of the effective portions lying in the magnetic fields and the current passing therethrough remains constant.

8. A motor as claimed in claim 7 wherein said means decouples from the voltage source any of said coils having more than one effective portion lying within the magnetic field of a single pole piece.

9. A motor as claimed in claim 8 comprising two pole pieces each subtending an angle of 90° at said axis, said pole pieces being spaced by an angle of 90°, and three coils each having two effective portions subtending an angle of 90° at said axis.

10. A motor as claimed in claim 9 wherein said means comprises a three-segment commutator, each segment being coupled to a different pair of said coils.

11. A motor as claimed in claim 10 wherein said means further comprises two pairs of brushes, each of said pairs being coupled to said voltage source and being adapted to contact both of the segments connected to any of said coils having both effective portions within the magnetic field of a single pole piece.

12. A motor as claimed in claim 11 wherein said pairs of brushes are adapted to connect in series with said voltage source each coil having only one effective portion lying within a magnetic field.

13. A motor as claimed in claim 12 wherein said pairs of brushes are adapted to connect across the voltage source each coil having effective portions lying with the magnetic fields of different pole pieces.

References Cited in the file of this patent

FOREIGN PATENTS

| | | |
|---|---|---|
| 9,823 | Great Britain | of 1912 |
| 302,497 | Great Britain | Dec. 20, 1928 |
| 389,450 | Great Britain | Apr. 13, 1933 |
| 181,066 | Switzerland | Mar. 16, 1936 |